United States Patent
Shimizu et al.

(10) Patent No.: US 10,923,288 B2
(45) Date of Patent: *Feb. 16, 2021

(54) METHOD FOR PRODUCING ELECTRODE FOR ALUMINUM ELECTROLYTIC CAPACITOR

(71) Applicant: NIPPON LIGHT METAL COMPANY, LTD., Tokyo (JP)

(72) Inventors: Yuta Shimizu, Shizuoka (JP); Shuhei Enoki, Shizuoka (JP); Masahiko Katano, Shizuoka (JP); Toshifumi Taira, Osaka (JP); Kazuya Fujimoto, Osaka (JP); Shinya Sone, Osaka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/483,405

(22) PCT Filed: Dec. 7, 2017

(86) PCT No.: PCT/JP2017/043995
§ 371 (c)(1),
(2) Date: Aug. 2, 2019

(87) PCT Pub. No.: WO2018/146930
PCT Pub. Date: Aug. 16, 2018

(65) Prior Publication Data
US 2020/0013556 A1 Jan. 9, 2020

(30) Foreign Application Priority Data
Feb. 9, 2017 (JP) .................................. 2017-022059

(51) Int. Cl.
*H01G 9/00* (2006.01)
*H01G 9/045* (2006.01)
(Continued)

(52) U.S. Cl.
CPC .......... *H01G 9/0029* (2013.01); *H01G 9/045* (2013.01); *H01G 9/15* (2013.01); *H01G 2009/0416* (2013.01)

(58) Field of Classification Search
CPC ............. H01G 2009/0014; H01G 9/15; H01G 9/2009; H01G 2009/0408; H01G 9/045
See application file for complete search history.

(56) References Cited

U.S. PATENT DOCUMENTS

2019/0362902 A1* 11/2019 Shimizu ................. H01G 9/045

FOREIGN PATENT DOCUMENTS

| JP | H09-275040 A | 10/1997 |
| JP | 2003-193260 A | 7/2003 |

(Continued)

OTHER PUBLICATIONS

WIPO, International Search Report for PCT Patent Application No. PCT/JP2017/043995, dated Mar. 6, 2018.

(Continued)

*Primary Examiner* — Scott B Geyer

(57) ABSTRACT

A method for producing an electrode for an aluminum electrolytic capacitor is provided that can reduce defects in a chemical formation film formed at a chemical formation voltage of 500 V or higher.
For producing the electrode for an aluminum electrolytic capacitor, an aluminum electrode is brought into contact with pure water having a temperature of 70° C. or higher to form a hydrated film having a suitable film thickness on the aluminum electrode at a hydration step, and then chemical formation is performed thereon at a chemical formation voltage of 500 V or higher in a chemical formation solution having a temperature of 40° C. or higher at a chemical formation step. At the chemical formation step, when the relative velocity of the chemical formation solution to the (Continued)

aluminum electrode is represented by a three-dimensional velocity vector B–A and the absolute value of the velocity vector B–A is represented by |B–A|, the absolute value |B–A| of the velocity vector satisfies the following conditional formula.

$$3 \text{ cm/s} \leq |B-A| \leq 100 \text{ cm/s}$$

4 Claims, 2 Drawing Sheets

(51) Int. Cl.
  *H01G 9/15* (2006.01)
  *H01G 9/04* (2006.01)

(56) References Cited

FOREIGN PATENT DOCUMENTS

JP  2007-324151 A  12/2007
JP  2014-57000 A  3/2014

OTHER PUBLICATIONS

WIPO, Written Opinion for PCT Patent Application No. PCT/JP2017/043995, dated Mar. 6, 2018.

* cited by examiner

METHOD FOR PRODUCING ELECTRODE FOR ALUMINUM ELECTROLYTIC CAPACITOR

FIELD

The present invention relates to a method for producing an electrode for an aluminum electrolytic capacitor that performs chemical formation of an aluminum electrode.

BACKGROUND

In a process of producing anode foil for an aluminum electrolytic capacitor, an aluminum electrode having a porous layer is immersed into a hydration treatment liquid such as hot pure water to form a hydrated film on a surface of the aluminum electrode (hydration step), and then chemical formation is performed thereon in a chemical formation solution containing organic acid, inorganic acid, and salts thereof (chemical formation step), whereby a chemical formation film made of aluminum oxide is formed on the surface. By forming the hydrated film before the chemical formation step, the amount of electricity required for the chemical formation can be reduced, and also the electrostatic capacitance per unit area can be improved (see Patent Literature 1).

CITATION LIST

Patent Literature

Patent Literature 1: Japanese Unexamined Patent Publication No. 2014-57000

SUMMARY

Technical Problem

In the chemical formation film formed when the chemical formation is performed at a chemical formation voltage of 500 V or higher after the hydration step, many defects having a diameter of several nanometers to several tens of nanometers exist. It is thought that these defects are generated due to volumetric shrinkage when the hydrated film is dehydrated to become aluminum oxide. The chemical formation film in which these defects exist has a weak point that the chemical formation film tends to deteriorate due to hydration because water can easily enter the defects from the surface.

As a result of various studies made by the inventors of the present invention on these defects, it was found that, when the chemical formation is performed after the hydration step, such defects start to be generated at a voltage of 300 V or higher and this generation becomes noticeable particularly at 500 V or higher. Furthermore, as a result of repeated experiments and examinations made by the inventors of the present invention, it was found that, when the chemical formation is performed at a voltage of 300 V or lower, even if the defects are generated, a chemical formation solution or water enters the defects, whereby the defects are subjected to the chemical formation again to be repaired. It was also found that, when the chemical formation is performed at a voltage of 500 V or higher, heat generated in the chemical formation film becomes intense, which causes a chemical formation solution or water to boil and evaporate at a surface of the film before the chemical formation solution or the water penetrates into the defects, thereby making repair of the defects difficult.

In view of the above-described problems, it is an object of the present invention to provide a method for producing an electrode for an aluminum electrolytic capacitor that can reduce defects in a chemical formation film formed at a chemical formation voltage of 500 V or higher.

Solution to Problem

In order to solve the above problems, a method for producing an electrode for an aluminum electrolytic capacitor according to the present invention includes: a hydration step of bringing an aluminum electrode into contact with a hydration treatment liquid having a temperature of 70° C. or higher to form a hydrated film on the aluminum electrode; and a chemical formation step of performing chemical formation on the aluminum electrode at a chemical formation voltage of 500 V or higher in a chemical formation solution having a temperature of 40° C. or higher.

In the method, a film withstand voltage Vf (V) and a ratio x wt % satisfy a conditional formula:

$$(0.01 \times Vf) \leq x \leq (0.017 \times Vf + 28)$$

where x wt % is a ratio of the mass of the hydrated film to the mass of the aluminum electrode before the hydration step.

At the chemical formation step, an absolute value |B−A| of a velocity vector B−A satisfies a conditional formula:

$$3 \text{ cm/s} \leq |B-A| \leq 100 \text{ cm/s}$$

where A is a three-dimensional velocity vector of moving velocity of the aluminum electrode, B is a three-dimensional velocity vector of average flow velocity of the chemical formation solution in a range from a surface of the aluminum electrode to a position at 10 centimeters apart therefrom in a direction perpendicular to the surface of the aluminum electrode, B−A is a three-dimensional velocity vector of relative velocity of the chemical formation solution to the aluminum electrode, and |B−A| is the absolute value of the velocity vector B−A.

In the present invention, because the amount of the hydrated film generated at the hydration step is appropriate and the relative velocity of the chemical formation solution to the aluminum electrode surface satisfies the above relational formula, heat generated from the aluminum electrode during the chemical formation can be efficiently dissipated into the chemical formation solution. Thus, even when the chemical formation voltage is 500 V or higher, at the chemical formation step, the chemical formation solution or water can penetrate into defects in the chemical formation film, whereby the defects are repaired. Consequently, the electrode for an aluminum electrolytic capacitor according to the present invention has a high electrostatic capacitance and has a smaller number of defects in the chemical formation film, and is thus less likely to undergo deterioration caused by hydration. Herein, if |B−A| is smaller than 3 cm/s, the defects in the chemical formation film cannot be sufficiently repaired and the electrode for an aluminum electrolytic capacitor has an increased leakage current and tends to deteriorate due to hydration for the reasons that heat from the aluminum electrode surface cannot be sufficiently dissipated and diffusion of ions is insufficient, for example. In contrast, if |B−A| exceeds 100 cm/s, elution of aluminum ions from the aluminum electrode surface becomes excessive, and thus the electrostatic capacitance tends to decrease.

If the amount of the hydrated film generated at the hydration step is too small, heat generated during the chemical formation becomes greater, which makes repair of the defects difficult. In contrast, if the amount of the hydrated film generated at the hydration step is excessively large, the chemical formation solution or water is hindered from penetrating into defects by the thickly formed hydrated film, whereby repair of the defects is hindered. These defects can be removed to a certain extent by performing chemical formation again after performing depolarization, but cannot be sufficiently removed at a chemical formation voltage of 500 V or higher. This is because defects in an inner area of the film is left behind due to the thickly formed chemical formation film even if the depolarization is performed.

In the present invention, an embodiment may be provided in which the absolute value $|B-A|$ of the velocity vector satisfies a conditional formula:

$$5 \text{ cm/s} \leq |B-A| \leq 30 \text{ cm/s}$$

In the present invention, an embodiment may be provided in which absolute values $|A|$ and $|B|$ of the velocity vectors satisfy conditional formulae:

$$0 \text{ cm/s} \leq |A| \leq 100 \text{ cm/s}$$

$$3 \text{ cm/s} \leq |B| \leq 100 \text{ cm/s}$$

where $|A|$ and $|B|$ are absolute values of the velocity vectors A and B, respectively.

Advantageous Effects of Invention

In the present invention, because the amount of the hydrated film generated at the hydration step is appropriate and the relative velocity of the chemical formation solution to the aluminum electrode surface satisfies the above relational formula, heat generated from the aluminum electrode during chemical formation can be efficiently dissipated into the chemical formation solution. Thus, even when the chemical formation voltage is 500 V or higher, the chemical formation solution or water can penetrate into defects in the chemical formation film, whereby the defects are repaired. Consequently, the electrode for an aluminum electrolytic capacitor according to the present invention has a high electrostatic capacitance and has a smaller number of defects in the chemical formation film, and is thus less likely to undergo deterioration caused by hydration.

DESCRIPTION OF EMBODIMENTS

Electrode for Aluminum Electrolytic Capacitor

In the present invention, for producing an electrode for an aluminum electrolytic capacitor, a surface of an aluminum electrode is subjected to chemical formation to produce the electrode for an aluminum electrolytic capacitor. As the aluminum electrode, etched foil formed by etching aluminum foil, a porous aluminum electrode having porous layers that are formed by sintering aluminum powder and are deposited on both surfaces of an aluminum core material, or the like may be used. The etched foil includes a porous layer in which tunnel-like pits are formed. In the porous aluminum electrode, for example, porous layers 30 each having a thickness of 150 micrometers to 3000 micrometers are each formed on both surfaces of the aluminum core material having a thickness of 10 micrometers to 50 micrometers. Each porous layer is a layer formed by sintering aluminum powder, and the aluminum powder is sintered while pores are being retained with each other.

Constitution of Aluminum Electrolytic Capacitor

In order to produce an aluminum electrolytic capacitor using the aluminum electrode after chemical formation (the electrode for an aluminum electrolytic capacitor) of the present embodiment, for example, a capacitor element is formed by winding anode foil made of the aluminum electrode after chemical formation (the electrode for an aluminum electrolytic capacitor) and cathode foil with a separator interposed therebetween. Subsequently, the capacitor element is impregnated with an electrolytic solution (a paste). Thereafter, the capacitor element including the electrolytic solution is placed in an outer case, and the case is sealed with a sealing body.

When a solid electrolyte is used instead of the electrolytic solution, a solid electrolyte layer is formed on the surface of the anode foil made of the aluminum electrode after chemical formation (the electrode for an aluminum electrolytic capacitor) and then a cathode layer is formed on the surface of the solid electrolyte layer. Thereafter, the obtained product is sheathed with resin or the like. In this process, an anode terminal to be electrically connected to the anode and a cathode terminal to be electrically connected to the cathode are provided. In this case, a plurality of pieces of anode foil may be laminated.

Method for Producing Electrode for Aluminum Electrolytic Capacitor

Figure 1:
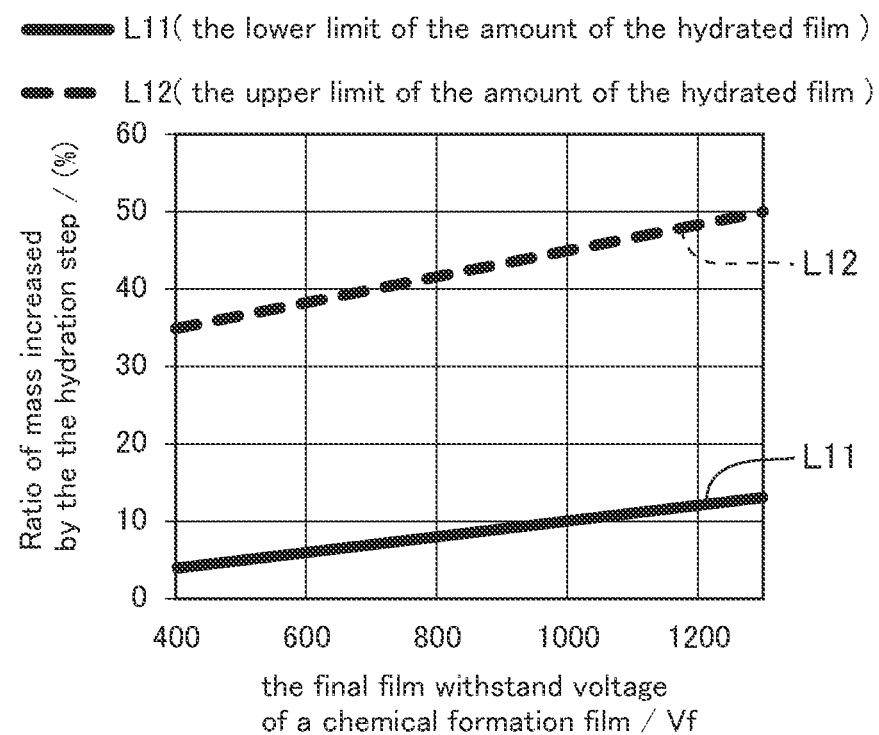
FIG. 1 is a graph illustrating a suitable range of the amount of a hydrated film to be generated at a hydration step in a method for producing an electrode for an aluminum electrolytic capacitor to which the present invention is applied.
Figure 2:
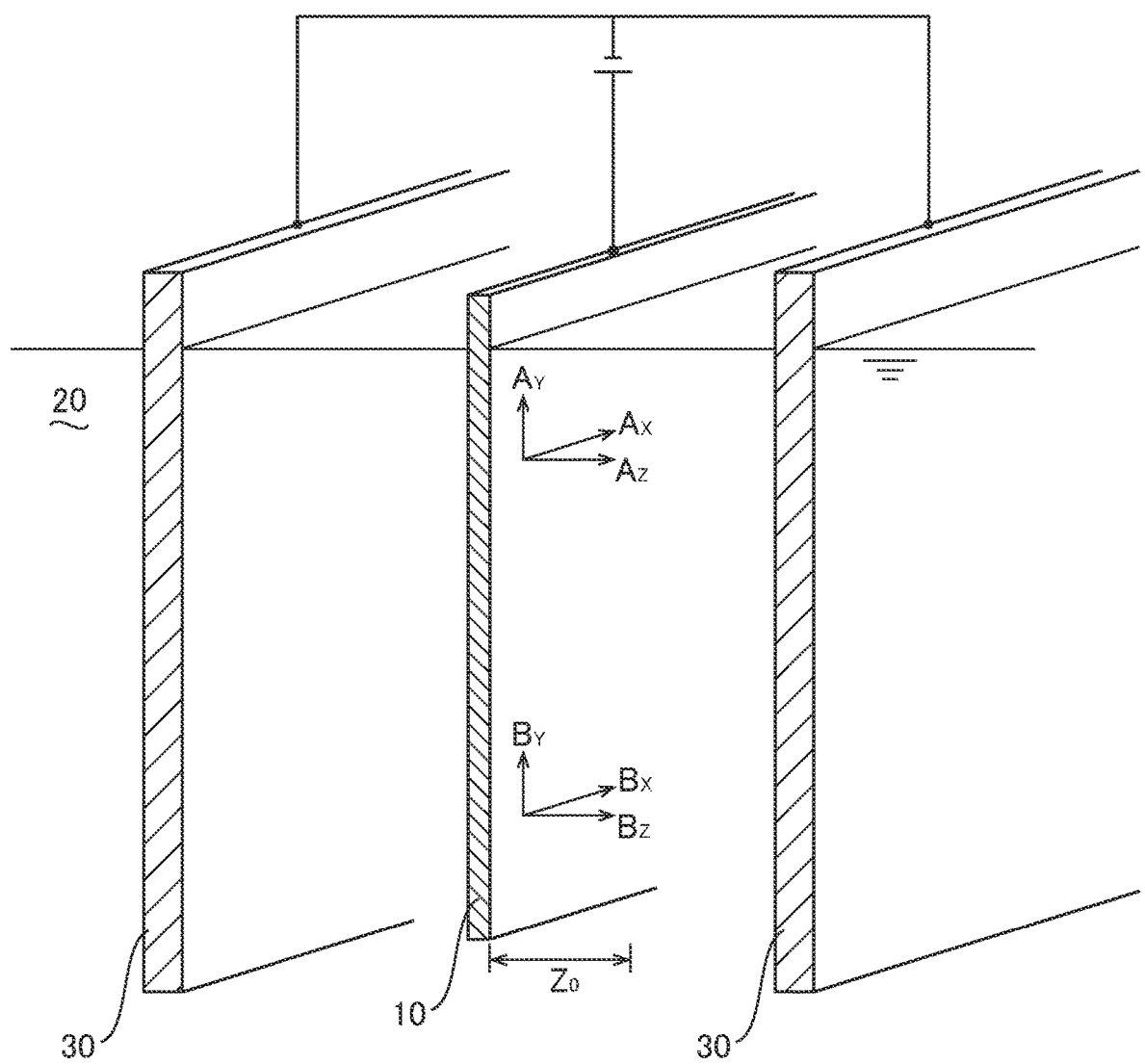
FIG. 2 is an explanatory diagram schematically illustrating a chemical formation step for the electrode for an aluminum electrolytic capacitor to which the present invention is applied.

FIG. 1 is a graph illustrating a suitable range of the amount of a hydrated film to be generated at a hydration step in a process for producing an electrode for an aluminum electrolytic capacitor to which the present invention is applied. FIG. 2 is an explanatory diagram schematically illustrating a chemical formation step for the electrode for an aluminum electrolytic capacitor to which the present invention is applied.

In this method for producing the electrode for an aluminum electrolytic capacitor of the present embodiment, a hydration step of bringing an aluminum electrode into contact with a hydration treatment liquid such as pure water having a temperature of 70° C. or higher to form a hydrated film on the aluminum electrode and a chemical formation step of performing chemical formation thereon at a chemical formation voltage of 500 V or higher in a chemical formation solution having a temperature of 40° C. or higher are performed.

In the present embodiment, at the hydration step, the aluminum electrode is boiled in pure water having a temperature of 70° C. or higher (from 70° C. to 100° C.) for 1 minute to 30 minutes to form a hydrated film such as boehmite (aluminum hydrated film) on this aluminum electrode 10. When a ratio x of mass increased by the hydration step is represented by the following formula (Mathematical formula 1), the amount of the hydrated film to be generated at the hydration step is set within a range from the lower limit of x indicated by the solid line L11 in FIG. 1 to the upper limit of x indicated by the broken line L12 in FIG. 1.

[Mathematical formula 1]

$$\begin{aligned}\text{Ratio } x(\%) \text{ of mass increased by the hydration step} &= \frac{\text{Mass (g) increased by the hydration step}}{\text{Mass (g) of aluminum electrode 10 before pure water boiling}} \times 100 \\ &= \frac{(\text{Mass (g) of aluminum electrode 10 after pure water boiling}) - (\text{Mass (g) of aluminum electrode 10 before pure water boiling})}{\text{Mass (g) of aluminum electrode 10 before pure water boiling}} \times 100\end{aligned}$$

More specifically, when the final film withstand voltage of a chemical formation film is represented by Vf (V) and the ratio of mass increased by the hydration step is represented by x, the solid line L11 indicating the lower limit of x is represented by the following formula.

$$x=(0.01 \times Vf)$$

The broken line L12 indicating the upper limit of x is represented by the following formula.

$$x=(0.017 \times Vf+28)$$

Thus, in the present embodiment, conditions of the hydration step are set such that the film withstand voltage Vf (V) and the ratio x (mass %) satisfy the following conditional formula.

$$(0.01 \times Vf) \le x \le (0.017 \times Vf+28)$$

At the chemical formation step, as illustrated in FIG. 2, for example, the aluminum electrode 10 is immersed in a chemical formation solution 20 stored in a chemical formation tank (not illustrated). In the chemical formation solution 20, a pair of counter electrodes 30 are disposed, and both surfaces of the aluminum electrode 10 face the respective counter electrodes 30. In this state, chemical formation is performed with the aluminum electrode 10 used as an anode and the counter electrodes 30 used as cathodes, whereby the aluminum electrode 10 is subjected to the chemical formation. Consequently, on both surfaces of the aluminum electrode 10, aluminum oxide (chemical formation films) is formed. At this time, part of the hydrated film formed at the hydration step is dehydrated to become aluminum oxide, and is included in part of the chemical formation film.

At this chemical formation step, as the chemical formation solution 20, for example, an aqueous solution of an organic acid such as adipic acid or a salt thereof is used. For example, in an aqueous solution (organic acid-based chemical formation solution 20) containing an organic acid such as adipic acid or a salt thereof and having a specific resistance of 5 Ωm to 500 Ωm measured at 50° C., the aluminum electrode 10 is subjected to the chemical formation under a condition of a liquid temperature of 40° C. to 90° C. In this process, the power supply voltage applied between the aluminum electrode 10 and each counter electrode 30 is raised until the power supply voltage reaches the final chemical formation voltage Vf, and then the power supply voltage is maintained at the chemical formation voltage Vf.

Instead of the chemical formation solution 20 using an organic acid such as adipic acid or a salt thereof, an aqueous solution containing an inorganic acid such as boric acid or phosphoric acid or a salt thereof may be used as the chemical formation solution 20. For example, in an aqueous solution (inorganic acid-based chemical formation solution 20) containing an inorganic acid such as boric acid or phosphoric acid or a salt thereof and having a specific resistance of 10 Ωm to 1000 Ωm measured at 90° C., the aluminum electrode 10 is subjected to the chemical formation under a condition of a liquid temperature of 40° C. to 95° C.

Alternatively, until the final chemical formation voltage Vf is reached, the chemical formation may be performed in the chemical formation solution 20 using an organic acid such as adipic acid or a salt thereof, and then the chemical formation voltage Vf may be maintained (constant-voltage chemical formation) in the chemical formation solution 20 using an inorganic acid such as boric acid or phosphoric acid or a salt thereof.

When either of these chemical formation solutions 20 is used, in the course of the chemical formation step, depolarization treatment such as thermal depolarization treatment of heating the aluminum electrode 10 and in-liquid depolarization treatment of immersing the aluminum electrode 10 in an aqueous solution containing phosphate ions, for example, is performed. In the thermal depolarization treatment, for example, the treatment temperature is 450° C. to 550° C., and the treatment time is 2 minutes to 10 minutes. In the in-liquid depolarization treatment, the aluminum electrode 10 is immersed in an aqueous solution of 20 mass % to 30 mass % phosphoric acid for 5 minutes to 15 minutes depending on the film withstand voltage under a condition of a liquid temperature of 60° C. to 70° C. In the in-liquid depolarization treatment, no voltage is applied to the aluminum electrode 10.

In the course of voltage rise of the power supply voltage to the chemical formation voltage, a phosphoric acid immersion step of immersing the aluminum electrode 10 in an aqueous solution containing phosphate ions may be performed. At this phosphoric acid immersion step, the aluminum electrode 10 is immersed in a phosphoric acid aqueous solution having a liquid temperature of 40° C. to 80° C. and having a specific resistance of 0.1 Ωm to 5 Ωm measured at 60° C. for a period of 3 minutes to 30 minutes. By this phosphoric acid immersion step, aluminum hydroxide precipitated at the chemical formation step can be efficiently removed, and the subsequent generation of aluminum hydroxide can be reduced. In addition, phosphate ions can be taken into the chemical formation film by the phosphoric acid immersion step, and thus the stability of the chemical formation film such as being able to improve durability for immersion in boiling water or acidic solution can be effectively improved.

Relative Velocity of Chemical Formation Solution to Aluminum Electrode

In the present embodiment, when the chemical formation step is performed in the state illustrated in FIG. 2, the aluminum electrode 10 and the chemical formation solution 20 are maintained stationary, or are maintained in a state of being moved. Performing the chemical formation while the aluminum electrode 10 is being moved is to perform the chemical formation while the aluminum electrode 10 that is in a state of being immersed in the chemical formation solution 20 is being moved. Performing the chemical formation while the chemical formation solution 20 is being moved is to perform the chemical formation while the chemical formation solution 20 in which the aluminum electrode 10 is immersed is being moved by circulation or stirring.

In the present embodiment, when the moving velocity of the aluminum electrode 10 is represented by a three-dimensional velocity vector A, the average flow velocity of the chemical formation solution 20 in a range $Z_0$ from a surface of the aluminum electrode 10 to a position at 10 centimeters apart therefrom in a direction perpendicular to the surface of the aluminum electrode 10 is represented by a three-dimensional velocity vector B, the relative velocity of the chemical formation solution 20 to the aluminum electrode 10 is represented by a three-dimensional velocity vector B−A, and the absolute value of the velocity vector B−A is represented by |B−A|, the absolute value |B−A| of this velocity vector satisfies the following conditional formula.

$$3 \text{ cm/s} \leq |B-A| \leq 100 \text{ cm/s}$$

In the present embodiment, the absolute value |B−A| of the velocity vector satisfies the following conditional formula.

$$5 \text{ cm/s} \leq |B-A| \leq 30 \text{ cm/s}$$

When the absolute values of the velocity vectors A and B are represented by |A| and |B|, respectively, the respective absolute values |A| and |B| of the velocity vectors satisfy the following conditional formulae.

$$0 \text{ cm/s} \leq |A| \leq 100 \text{ cm/s}$$

$$3 \text{ cm/s} \leq |B| \leq 100 \text{ cm/s}$$

Herein, when the chemical formation is performed while the aluminum electrode 10 is maintained stationary, the absolute value |A| of the velocity vector becomes zero.

In FIG. 2, among directions extending along both surfaces of the aluminum electrode 10, the lateral direction (horizontal direction) is defined as X-direction, and the up-and-down direction (vertical direction) is defined as Y-direction. The direction in which the aluminum electrode 10 faces the counter electrodes 30 is defined as Z-direction. Thus, the three-dimensional velocity vector A of the moving velocity of the aluminum electrode 10 corresponds to a vector obtained by combining the velocity vector $A_X$ in the X-direction, the velocity vector $A_Y$ in the Y-direction, and the velocity vector $A_Z$ in the Z-direction. The absolute value |A| of the velocity vector A is represented by the following formula.

$$|A| = \sqrt{(A_X^2 + A_Y^2 + A_Z^2)}$$

The three-dimensional velocity vector B of the moving velocity of the chemical formation solution 20 corresponds to a vector obtained by combining the velocity vector $B_X$ in the X-direction, the velocity vector $B_Y$ in the Y-direction, and the velocity vector $B_Z$ in the Z-direction. The absolute value |B| of the velocity vector B is represented by the following formula.

$$|B| = \sqrt{(B_X^2 + B_Y^2 + B_Z^2)}$$

The absolute value |B−A| of the three-dimensional velocity vector B−A of the relative velocity of the chemical formation solution 20 to the aluminum electrode 10 is represented by the following formula.

$$|B-A| = \sqrt{((B_X-A_X)^2 + (B_Y-A_Y)^2 + (B_Z-A_Z)^2)}$$

Main Effects of the Present Embodiment

As described in the foregoing, in the method for producing the aluminum electrode of the present embodiment, because the amount of the hydrated film generated at the hydration step is appropriate and the relative velocity of the chemical formation solution to the aluminum electrode surface satisfies the above relational formula, heat generated from the aluminum electrode during the chemical formation can be efficiently dissipated into the chemical formation solution. Thus, even when the chemical formation voltage is 500 V or higher, the chemical formation solution or water can penetrate into defects in the chemical formation film, whereby the defects can be repaired. Consequently, the electrode for an aluminum electrolytic capacitor according to the present invention has a high electrostatic capacitance and has a smaller number of defects in the chemical formation film, and is thus less likely to undergo deterioration caused by hydration.

Herein, if |B−A| is smaller than 3 cm/s, the defects in the chemical formation film cannot be sufficiently repaired and the electrode for an aluminum electrolytic capacitor has an increased leakage current and tend to deteriorate due to hydration for the reasons that heat from the aluminum electrode surface cannot be sufficiently dissipated and diffusion of ions is insufficient, for example. In contrast, if |B−A| exceeds 100 cm/s, elution of aluminum ions from the aluminum electrode surface becomes excessive, and thus the electrostatic capacitance tends to decrease.

If the amount of the hydrated film generated at the hydration step is too small, heat generated during the chemical formation becomes greater, which makes repair of the defects difficult. In contrast, if the amount of the hydrated film generated at the hydration step is excessively large, the chemical formation solution or water is hindered from penetrating into defects by the thickly formed hydrated film, whereby repair of the defects is hindered.

EXAMPLES

The following describes Examples of the present invention. Table 1 gives conditions for producing an electrode for an aluminum electrolytic capacitor according to each of Examples 1 and 2 and Comparative Examples 1 and 2 of the present invention. Table 2 gives characteristics of the electrode for an aluminum electrolytic capacitor according to each of Examples 1 and 2 and Comparative Examples 1 and 2 of the present invention. Results given in Table 2 are results of measurements according to "Test methods of electrode foil for aluminium electrolytic capacitors" provided in EIAJ RC 2364A and, for example, the hydration resistance is given as a period of time (seconds) until the power supply voltage was raised to the film withstand voltage when a constant current was applied after each sample was immersed in pure water at 95° C. or higher for 60±1 minutes. As given in Table 1, in any of Examples 1 and 2 and Comparative Examples 1 and 2, etched foil (foil thickness: 120 μm) the surface area of which had been increased by etching was used as an aluminum electrode.

TABLE 1

| | Type of aluminum electrode | Ratio x (%) of mass of aluminum hydrated film formed at hydration step to mass of aluminum electrode before hydration step | Chemical formation solution for first chemical formation | B − A (cm/s) |
|---|---|---|---|---|
| Example 1 | Etched foil | 15 | 10%-boric acid aqueous solution | 10 |
| Example 2 | Etched foil | 15 | 0.05%-adipic acid ammonium aqueous solution | 5 |
| Comparative Example 1 | Etched foil | 15 | 10%-boric acid aqueous solution | 2 |
| Comparative Example 2 | Etched foil | 5 | 10%-boric acid aqueous solution | 10 |

TABLE 2

| | Electrostatic capacitance ($\mu F/cm^2$) | Film withstand voltage (V) | Hydration resistance (s) |
|---|---|---|---|
| Example 1 | 0.47 | 718 | 10 |
| Example 2 | 0.51 | 712 | 8 |
| Comparative Example 1 | 0.47 | 701 | 120 |
| Comparative Example 2 | 0.40 | 705 | 150 |

As indicated in Table 1, in Example 1, the aluminum electrode was immersed in pure water having a temperature of 95° C. at the hydration step, and the ratio x of the mass of the hydrated film formed at the hydration step to the mass of the aluminum electrode before the hydration step was set to 15%. At the chemical formation step, as first chemical formation, the aluminum electrode was immersed in a 10%-boric acid aqueous solution (80° C.), the power supply voltage was raised to 700 V and, after reaching 700 V, the power supply voltage was maintained for 30 minutes. Subsequently, the aluminum electrode was washed with water, and was immersed in a 5%-phosphoric acid aqueous solution (70° C.) for 10 minutes, and then the aluminum electrode was washed with water. As second chemical formation, the aluminum electrode was immersed in a 10%-boric acid aqueous solution (80° C.), and was subjected to chemical formation again at a voltage of 700 V for 5 minutes. At the chemical formation step, the absolute value |B−A| of the three-dimensional velocity vector B−A of the relative velocity of the chemical formation solution to the aluminum electrode was set to 10 cm/s. Herein, to the boric acid aqueous solution used as the chemical formation solution, ammonia water or the like was added to adjust pH and the specific resistance.

In Example 2, the chemical formation solution used at the first chemical formation was a 0.05 mass % adipic acid ammonium aqueous solution, and the absolute value |B−A| of the three-dimensional velocity vector B−A of the relative velocity of the chemical formation solution to the aluminum electrode at the chemical formation step was set to 5 cm/s. The other conditions are the same as those in Example 1.

In Comparative Example 1, the absolute value |B−A| of the three-dimensional velocity vector B−A of the relative velocity of the chemical formation solution to the aluminum electrode at the chemical formation step was set to 2 cm/s. The other conditions are the same as those in Example 1.

In Comparative Example 2, the ratio x of the mass of the hydrated film formed at the hydration step to the mass of the aluminum electrode before the hydration step was set to 5%. The other conditions are the same as those in Example 1.

As indicated in Table 2, the hydration resistances in Examples 1 and 2 were 10 seconds and 8 seconds, respectively, which are excellent results. By contrast, in Comparative Example 1, conditions thereof were substantially similar to those of Example 1, but |B−A| was smaller than 3 cm/s. Thus, for the reasons that heat from the aluminum electrode surface cannot be sufficiently dissipated, for example, defects in the chemical formation film were not sufficiently repaired, and accordingly the leakage current increased and the hydration resistance deteriorated to 120 seconds. In Comparative Example 2, conditions thereof were substantially similar to those of Example 1, but the ratio x of the mass of the hydrated film formed by the hydration step to the mass of the aluminum electrode before the hydration step was lower than the lower limit value (7.05%) indicated by the solid line L11 in FIG. 1. Thus, heat generated at the chemical formation step became significantly great, which made repair of the defects difficult, and consequently the hydration resistance deteriorated to 150 seconds.

Other Embodiments

In Examples described above, etched foil was used as the aluminum electrode. However, for example, also when a porous aluminum electrode having porous layers deposited on both surfaces of an aluminum core material, the porous layers being formed by sintering aluminum powder, was used, similar results were obtained. Furthermore, as a result of studying various conditions in addition to Examples described above, a result was obtained indicating that defects in the chemical formation film could be reduced if the ratio x of the mass of the hydrated film to the mass of the aluminum electrode before the hydration step and the velocity vectors of the aluminum electrode and the chemical formation solution satisfied the conditional formulae described above, even when the chemical formation film was formed at a chemical formation voltage of 500 V or higher.

REFERENCE SIGNS LIST

10 . . . aluminum electrode, 20 . . . chemical formation solution, 30 . . . counter electrode

The invention claimed is:
1. A method for producing an electrode for an aluminum electrolytic capacitor, the method comprising:
   a hydration step of bringing an aluminum electrode into contact with a hydration treatment liquid having a temperature of 70° C. or higher to form a hydrated film on the aluminum electrode; and
   a chemical formation step of performing chemical formation on the aluminum electrode at a chemical formation voltage of 500 V or higher in a chemical formation solution having a temperature of 40° C. or higher, wherein a film withstand voltage Vf (V) and a ratio x wt % satisfy a conditional formula:

$$(0.01 \times Vf) \leq x \leq (0.017 \times Vf + 28)$$

where x wt % is a ratio of the mass of the hydrated film to the mass of the aluminum electrode before the hydration step, and at the chemical formation step, an absolute value |B−A| of a velocity vector B−A satisfies a conditional formula:

3 cm/s ≤ |B−A| ≤ 100 cm/s where A is a three-dimensional velocity vector of moving velocity of the aluminum electrode, B is a three-dimensional velocity vector of average flow velocity of the chemical formation solution in a range from a surface of the aluminum electrode to a position at 10 centimeters apart therefrom in a direction perpendicular to the surface of the aluminum electrode, B−A is a three-dimensional velocity vector of the relative velocity of the chemical formation solution to the aluminum electrode, and |B−A| is the absolute value of the velocity vector B−A.

2. The method for producing an electrode for an aluminum electrolytic capacitor according to claim 1, wherein the absolute value |B−A| of the velocity vector satisfies a conditional formula:

5 cm/s ≤ |B−A| ≤ 30 cm/s.

3. The method for producing an electrode for an aluminum electrolytic capacitor according to claim 2, wherein absolute values |A| and |B| of the velocity vectors satisfy conditional formulae:

0 cm/s ≤ |A| ≤ 100 cm/s 3 cm/s ≤ |B| ≤ 100 cm/s where |A| and |B| are absolute values of the velocity vectors A and B, respectively.

4. The method for producing an electrode for an aluminum electrolytic capacitor according to claim 1, wherein absolute values |A| and |B| of the velocity vectors satisfy conditional formulae:

0 cm/s ≤ |A| ≤ 100 cm/s 3 cm/s ≤ |B| ≤ 100 cm/s where |A| and |B| are absolute values of the velocity vectors A and B, respectively.

* * * * *